United States Patent
Erdogan et al.

(10) Patent No.: US 12,235,705 B2
(45) Date of Patent: *Feb. 25, 2025

(54) FRAME-BASED, LOW POWER INTERFACES BETWEEN DEVICES WITH DIFFERENT I/O SIGNALS

(71) Applicant: TEXAS INSTRUMENTS INCORPORATED, Dallas, TX (US)

(72) Inventors: Mustafa Ulvi Erdogan, Allen, TX (US); Suzanne Mary Vining, Plano, TX (US); Bharath Kumar Singareddy, Bangalore (IN); Douglas Edward Wente, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/534,911

(22) Filed: Dec. 11, 2023

(65) Prior Publication Data
US 2024/0103595 A1    Mar. 28, 2024

Related U.S. Application Data

(63) Continuation of application No. 17/330,027, filed on May 25, 2021, now Pat. No. 11,874,718.

(60) Provisional application No. 63/131,880, filed on Dec. 30, 2020.

(51) Int. Cl.
| G06F 1/3215 | (2019.01) |
| G06F 1/3234 | (2019.01) |
| G06F 13/38 | (2006.01) |
| G06F 13/42 | (2006.01) |

(52) U.S. Cl.
CPC .......... *G06F 1/3215* (2013.01); *G06F 1/3253* (2013.01); *G06F 13/385* (2013.01); *G06F 13/4282* (2013.01); *G06F 2213/0042* (2013.01)

(58) Field of Classification Search
CPC ........ G06F 1/32; G06F 1/3203; G06F 1/3206; G06F 1/3215; G06F 1/3253; G06F 1/3287; G06F 13/4004; G06F 13/4027; G06F 13/4045; G06F 13/4282; G06F 2213/0042;
(Continued)

(56) References Cited

U.S. PATENT DOCUMENTS

| 10,891,242 B2 | 1/2021 | Wente et al. |
| 11,281,284 B2 | 3/2022 | Vining et al. |
| 11,874,718 B2 * | 1/2024 | Erdogan ............... G06F 1/3215 |

(Continued)

*Primary Examiner* — Thomas J. Cleary
(74) *Attorney, Agent, or Firm* — Valerie M. Davis; Frank D. Cimino

(57) ABSTRACT

High-speed data communication devices, e.g., repeaters, interfacing between a host and a peripheral operate such that high-speed components except for a host-side squelch detector are set or maintained in a deactivated state during an idle period of a micro frame. In an example, a start of a micro frame is detected on a data bus during a first time period. In a second time period after the first time period, the high-speed communication device determines whether at least one data packet is contained in the micro frame. When it is determined during the second time period that no data packet is contained in the micro frame, active components, except a squelch detector, are controlled to be inactive during a third time period after the second time period.

20 Claims, 3 Drawing Sheets

(58) Field of Classification Search
CPC .... G06F 1/3209; G06F 1/3278; G06F 13/385; G06F 13/4072; Y02D 10/00
See application file for complete search history.

(56) References Cited

U.S. PATENT DOCUMENTS

| | | |
|---|---|---|
| 2008/0233912 A1 | 9/2008 | Hunsaker et al. |
| 2010/0081406 A1 | 4/2010 | Tan et al. |
| 2012/0311359 A1 | 12/2012 | Jaramillo |
| 2012/0317446 A1 | 12/2012 | Jaramillo |
| 2014/0006674 A1 | 1/2014 | Chan et al. |
| 2014/0047257 A1 | 2/2014 | Masson et al. |
| 2016/0320823 A1 | 11/2016 | Gerber et al. |
| 2017/0286360 A1 | 10/2017 | Srivastava |
| 2018/0307293 A1 | 10/2018 | Lambert et al. |
| 2020/0257354 A1 | 8/2020 | Vining et al. |
| 2020/0272590 A1 | 8/2020 | Maung et al. |
| 2022/0137695 A1 | 5/2022 | Vining et al. |
| 2022/0206983 A1* | 6/2022 | Erdogan ............. G06F 13/4282 |

\* cited by examiner

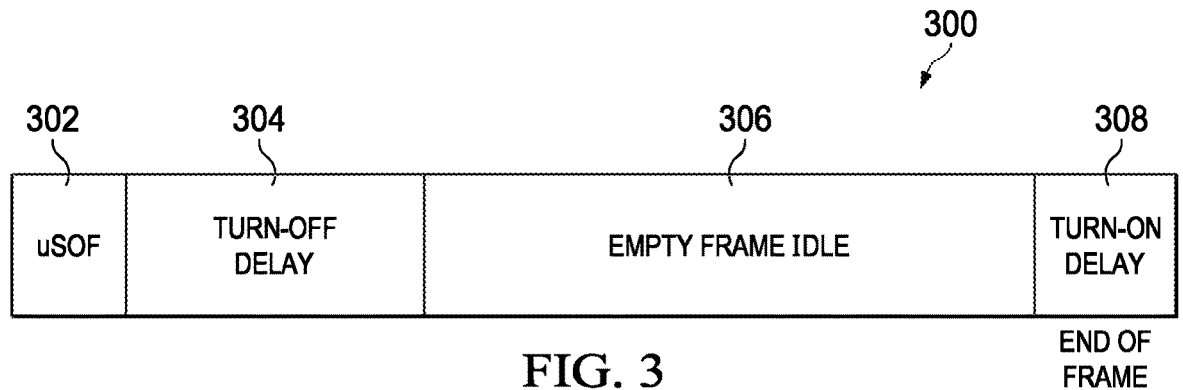

| | | HOST MODE | | | | |
|---|---|---|---|---|---|---|
| 108 | eUSB2 PORT | INITIAL PERIOD (STATE 1) | μSOF PERIOD (STATE 2) | TURN-OFF DELAY PERIOD (STATE 1) | IDLE PERIOD (STATE 3) | TURN-ON DELAY PERIOD (STATE 1) |
| 122 | TX | STANDBY | ON | STANDBY | OFF | STANDBY |
| 124 | RX | ON | ON | ON | OFF | ON |
| 130 | SQ | ON | ON | ON | ON | ON |
| 134 | LOS | STANDBY | ON | STANDBY | OFF | STANDBY |
| 112 | USB 2.0 PORT | INITIAL PERIOD (STATE 1) | μSOF PERIOD (STATE 2) | TURN-OFF DELAY PERIOD (STATE 1) | IDLE PERIOD (STATE 3) | TURN-ON DELAY PERIOD (STATE 1) |
| 128 | RX | STANDBY | ON | STANDBY | OFF | STANDBY |
| 126 | TX | ON | ON | ON | OFF | ON |
| 132 | SQ | STANDBY | ON | STANDBY | OFF | STANDBY |
| 136 | DSC | STANDBY | ON | STANDBY | OFF | STANDBY |

PERIPHERAL MODE

| | | INITIAL PERIOD (STATE 1) | μSOF PERIOD (STATE 1) | TURN-OFF DELAY PERIOD (STATE 1) | IDLE PERIOD (STATE 3) | TURN-ON DELAY PERIOD (STATE 1) |
|---|---|---|---|---|---|---|
| 212 | USB 2.0 PORT | | | | | |
| 226 | TX | STANDBY | STANDBY | STANDBY | OFF | STANDBY |
| 228 | RX | ON | ON | ON | OFF | ON |
| 232 | SQ | ON | ON | ON | ON | ON |
| 236 | LOS | STANDBY | STANDBY | STANDBY | OFF | STANDBY |
| 208 | eUSB2 PORT | INITIAL PERIOD (STATE 1) | μSOF PERIOD (STATE 1) | TURN-OFF DELAY PERIOD (STATE 1) | IDLE PERIOD (STATE 3) | TURN-ON DELAY PERIOD (STATE 1) |
| 224 | RX | STANDBY | STANDBY | STANDBY | OFF | STANDBY |
| 222 | TX | ON | ON | ON | OFF | ON |
| 230 | SQ | STANDBY | STANDBY | STANDBY | OFF | STANDBY |
| 234 | DSC | STANDBY | STANDBY | STANDBY | OFF | STANDBY |

FIG. 5

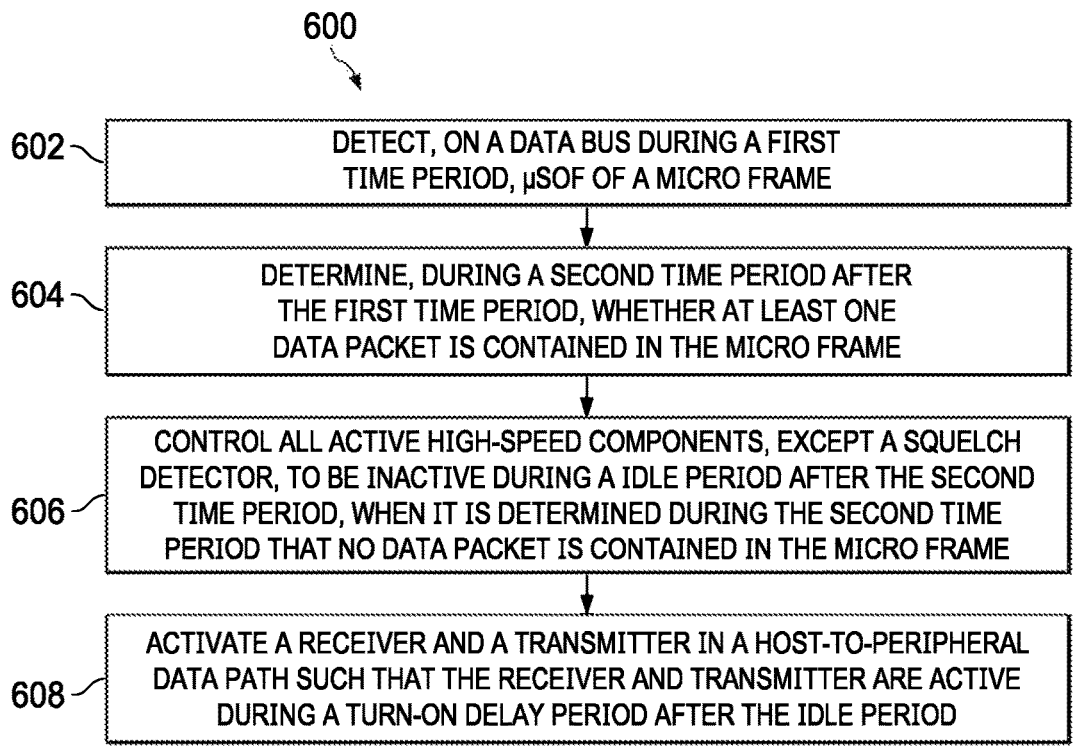

FIG. 6

FRAME-BASED, LOW POWER INTERFACES BETWEEN DEVICES WITH DIFFERENT I/O SIGNALS

CROSS-REFERENCE TO RELATED APPLICATION

This application is a continuation of U.S. patent application Ser. No. 17/330,027, filed May 25, 2021, which claims priority to U.S. provisional Application No. 63/131,880, filed Dec. 30, 2020, titled "Frame Based Ultra Low Power eUSB2 Redriver," all of which are hereby incorporated herein by reference in their entireties.

FIELD OF DISCLOSURE

This disclosure relates generally to interfaces between devices with different input/output (I/O) signals, and more specifically to frame-based, low power interfaces, e.g., repeaters and redrivers, between devices with different I/O voltages and methods of operating the same.

BACKGROUND

The embedded USB2 (eUSB2) specification (which is hereby incorporated by reference in its entirety) is a supplement to the Universal Serial Bus (USB) 2.0 specification that enables integration with advanced system-on-chip (SoC) process nodes by enabling USB 2.0 interfaces to operate at I/O voltages of 1 V or 1.2 V, instead of 3.3 V. Thus, eUSB2 enables more power-efficient SoCs, which in turn, enables continued scaling of process nodes while increasing performance in electronic devices, e.g., smartphones, tablets and notebooks.

eUSB2 can support onboard inter-device connectivity through direct connection between two eUSB2 configured elements, as well as through a repeater, which is used to transition the difference in voltage between that used in advanced SoCs (1 V or 1.2 V) and that used in legacy applications (3.3 V). A repeater is a half-duplex bidirectional interconnect that operates as a bridge or non-linear redriver to perform level shifting to enable a legacy USB device to communicate with an eUSB2 device, and vice versa.

USB 2.0 uses a micro frame structure to send and receive data in high speed mode. However, keeping high speed mode functional blocks active during transmission of the entire length of a micro frame even when it contains no data packets consumes power unnecessarily. Excess power consumption is an issue in any application, and is especially important in applications in which there is very little data traffic on average, e.g., audio. A solution to lower time-average power is thus desirable.

SUMMARY

An example method of operating a high-speed data communication device comprises detecting, on a data bus during a first time period, a start of a micro frame; determining, during a second time period after the first time period, whether at least one data packet is contained in the micro frame; and in response to determining that the micro frame discloses a data packet during the second time period, controlling active components, except a squelch detector, to be inactive during a third time period after the second time period.

In accordance with an example, a repeater interfaces between a host and a peripheral, and the repeater comprises a host-side squelch detector, e.g., to monitor data traffic from the host and to determine whether at least one data packet is contained in a micro frame; a peripheral-side squelch detector; a host-side receiver and a host-side transmitter, each coupled to the host-side squelch detector; and a peripheral-side receiver and a peripheral-side transmitter, each coupled to the peripheral-side squelch detector. Each of the peripheral-side squelch detector, the host-side receiver, the host-side transmitter, the peripheral-side receiver, and the peripheral-side transmitter are configured to be inactive for a threshold time period after a set time period during which the host-side squelch detector determines that the micro frame discludes a data packet.

In accordance with an example, a repeater comprises a first port including a first transmitter, a first receiver, and a first squelch detector; and a second port including a second transmitter, a second receiver, and a second squelch detector. The first transmitter, the first receiver, the second transmitter, the second receiver, and the second squelch detector are configured to be in an inactive state in an idle period of a micro frame when the first squelch detector determines during a detection period of the micro frame that no data packet is contained in the micro frame.

These and other features will be better understood from the following detailed description with reference to the accompanying drawings.

BRIEF DESCRIPTION OF THE DRAWINGS

Features of the disclosure may be understood from the following figures taken in conjunction with the detailed description.

FIG. 3 is a diagram showing an example micro frame.

FIG. 4 is a table showing example states of components of an example host repeater in each of multiple time periods.

FIG. 5 is a table showing example states of components of an example peripheral repeater in each of multiple time periods.

FIG. 6 is a flow diagram of an example method of operating an example high-speed data communication device, e.g., a host or peripheral repeater.

The same reference numbers and other reference designators are used in the drawings to designate the same or similar (structurally and/or functionally) features.

DETAILED DESCRIPTION

Figure 1:
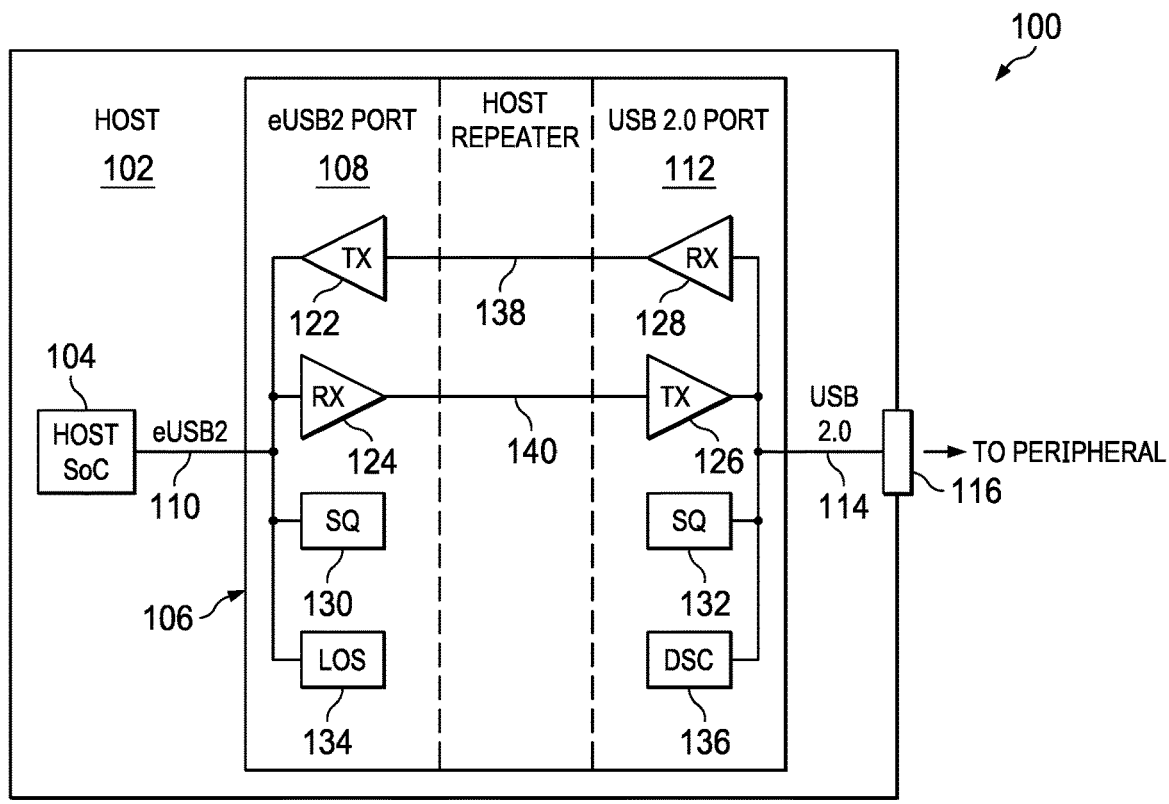
FIG. 1 is a diagram showing an example host repeater in a host.

Specific examples are described below in detail with reference to the accompanying figures. These examples are not intended to be limiting. In the drawings, corresponding numerals and symbols generally refer to corresponding parts unless otherwise indicated. The objects depicted in the drawings are not necessarily drawn to scale.

In example arrangements, when no data is detected during a period of time after receipt of a micro frame in which any data would be contained, active components, except a squelch detector, are controlled to be inactive during a subsequent time period. The inactive period may correspond to the portion of the micro frame that would carry data if there is any. In example implementations, there are two modes of operation: host mode and peripheral mode. In the host mode, a host repeater interfaces between a host system-on-chip (SoC) that operates at a lower voltage (e.g., 1 V or 1.2 V) and a legacy peripheral device that operates at a higher voltage (e.g., 3.3 V). In the host mode, the squelch detector that remains on during the idle period is disposed in an eUSB2 port of the host repeater, e.g., an eUSB2 squelch detector, while other components of the host repeater are off during the idle period. In the peripheral mode, a peripheral repeater interfaces between a peripheral SoC that operates at a lower voltage (e.g., 1 V or 1.2 V) and a legacy host that operates at a higher voltage (e.g., 3.3 V). In the peripheral mode, the squelch detector that remains on during the idle period is disposed in a USB 2.0 port of the peripheral repeater, e.g., an USB2 squelch detector, while other components of the peripheral repeater are off during the idle period. Thus, in each operation mode, the repeater maintains the ability to monitor data traffic from the host, which initiates transactions, while keeping other components in an OFF or standby state to save power when no data is being transmitted.

A component in the standby state is idle, although a small portion of its current is shunted to ground to maintain internal nodes and bias loops at normal levels to allow quick transition to the active, i.e., ON, state. Thus, standby is a low power state.

FIG. 1 is a diagram of a system 100 that includes a host 102 and a peripheral device (not shown) with which host 102 communicates in host mode. Host 102 includes a host SoC 104 and a high-speed host repeater 106 that enables host SoC 104, which operates at a lower voltage, to communicate with a peripheral device operating at a higher voltage. To that end, host repeater 106 includes an eUSB2 port 108 in communication with an eUSB2 bus 110 that is coupled to a terminal of host SoC 104. Host repeater 106 also includes a USB 2.0 port 112 in communication with a USB 2.0 bus 114 terminating in a USB 2.0 connector 116 having a terminal for connection to a USB 2.0 peripheral device. eUSB2 port 108 includes a high-speed transmitter 122 and a high-speed receiver 124. Likewise, USB 2.0 port 112 includes a high-speed transmitter 126 and a high-speed receiver 128. Ports 108 and 112 also include high-speed squelch detectors 130 and 132, respectively. eUSB2 port 108 also includes a loss of signal detector (LOS) 134 that is used in high-speed mode, and USB 2.0 port 112 includes a high-speed disconnect detector (DSC) 136. In the configuration of FIG. 1, transmitter 122, receiver 124, squelch detector 130 and LOS 134 are host-side components commonly coupled to eUSB2 bus 110, and transmitter 126, receiver 128, squelch detector 132 and DSC 136 are peripheral-side components commonly coupled to USB 2.0 bus 114.

Receiver 128 and transmitter 122 are coupled via a peripheral-to-host data path 138 from USB 2.0 bus 114 to eUSB2 bus 110. Receiver 124 and transmitter 126 are coupled via a host-to-peripheral data path 140 from eUSB2 bus 110 to USB 2.0 bus 114.

Figure 2:
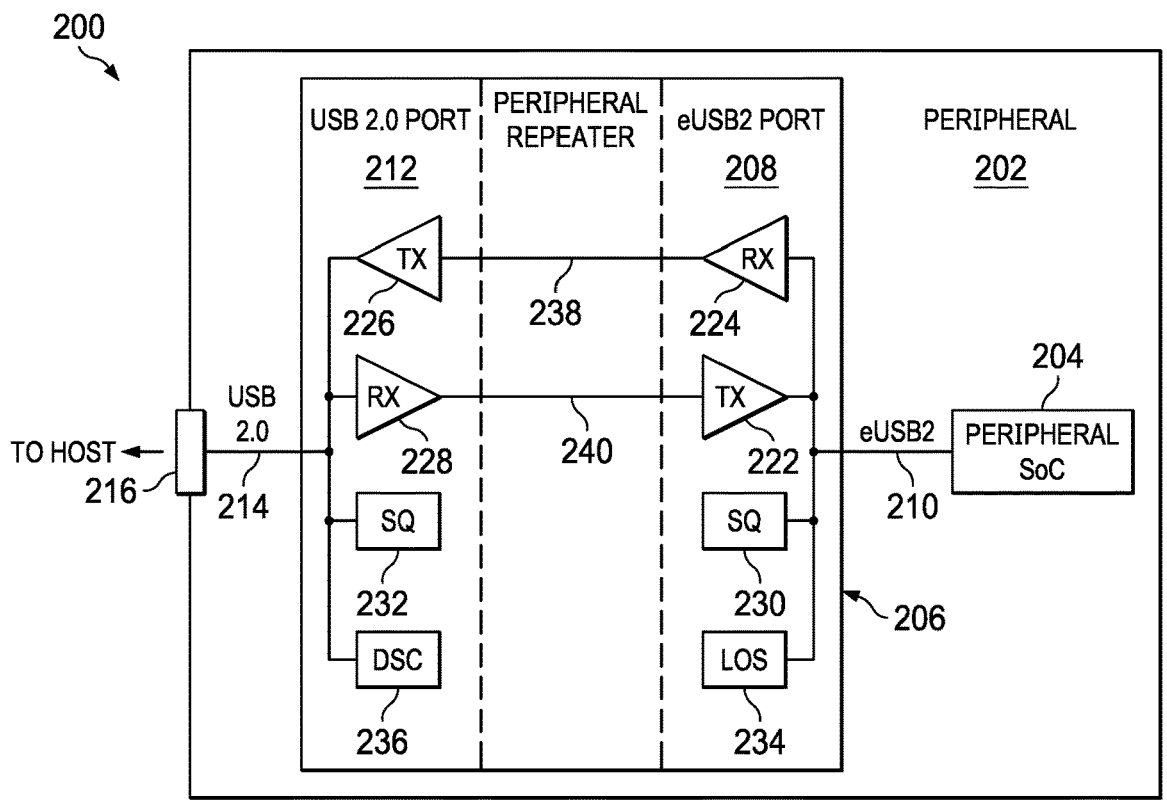
FIG. 2 is a diagram showing an example peripheral repeater in a peripheral device.

FIG. 2 is a diagram of a system 200 that includes a peripheral device 202 and a host with which peripheral device 202 communicates in peripheral mode. Peripheral device 202 includes a peripheral SoC 204 and a high-speed peripheral repeater 206 that enables peripheral SoC 204, which operates at a lower voltage, to communicate with a host (not shown) operating at a higher voltage. To that end, peripheral repeater 206 includes an eUSB2 port 208 in communication with an eUSB2 bus 210 coupled to a terminal of peripheral SoC 204. Peripheral repeater 206 also includes a USB 2.0 port 212 in communication with a USB 2.0 bus 214 terminating in a USB 2.0 connector 216 having a terminal for connection to a USB 2.0 host. eUSB2 port 208 includes a high-speed transmitter 222 and a high-speed receiver 224. Likewise, USB 2.0 port 212 includes a high-speed transmitter 226 and a high-speed receiver 228. Ports 208 and 212 also include high-speed squelch detectors 230 and 232, respectively. eUSB2 port 208 also includes a loss of signal detector (LOS) 234 that is used in high-speed mode, and USB 2.0 port 212 includes a high-speed disconnect detector (DSC) 236. In the configuration shown in FIG. 2, transmitter 222, receiver 224, squelch detector 230 and LOS 234 are peripheral-side components commonly coupled to eUSB2 bus 210, and transmitter 226, receiver 228, squelch detector 232 and DSC 236 are host-side components commonly coupled to USB 2.0 bus 214.

Receiver 224 and transmitter 226 are coupled via a peripheral-to-host data path 238 from eUSB2 bus 210 to USB 2.0 bus 214. Receiver 228 and transmitter 222 are coupled via a host-to-peripheral data path 240 from USB 2.0 bus 214 to eUSB2 bus 210.

FIG. 3 is a diagram showing an example structure of a micro frame 300 used in USB communication. Micro frame 300 includes a micro start of frame packet (μSOF) 302 that indicates the start of micro frame 300, which has a duration (sometimes referred to as a length) of 125 μs. A μSOF is periodically broadcast on the host-side bus every 125 μs indicating the start of another micro frame. In host mode, host-side squelch detector 130 of host repeater 106 is able to detect μSOF 302 by detecting its 40 unit interval (UI) end-of-packet (EOP). In peripheral mode, host-side squelch detector 232 and/or receiver 228 detects EOP of μSOF 302. Micro frame 300 also includes a turn-off delay segment 304 followed by a segment 306 in which data packets, if any, are delivered. When micro frame 300 is empty, segment 306 is an empty frame segment, the duration is denoted as an idle period. Following empty frame segment 306 is a turn-on delay segment 308.

According to a protocol, host repeater 106 starts transmitting packets on USB 2.0 bus 114 within 4 high-speed (HS) UIs, which is approximately 8 ns, of receiving a packet on eUSB2 bus 110. Under the protocol, the peripheral device connected to USB 2.0 bus 114 transmits to host 102 only after receiving a packet from host 102, and the peripheral device transmits within 192 UIs of receiving a packet from host 102. Host repeater 106 repeats isochronous token packets (i.e., time critical data). If isochronous packets are present, the first transfer is initiated within the turn-off delay at the beginning of a micro frame, e.g., turn-off delay 304 of micro frame 300. The gap between an isochronous token packet and the next packet is less than twice the duration of the turn-off delay. If packets appear after the high-speed transmission path is turned off or before it is turned back on, there is a risk of dropping one or more packets. Non-isochronous packets may be dropped, provided that host-to-peripheral transmission components, e.g., receiver 124 and transmitter 126, are enabled in time to perform a retry. The minimum time before a packet is retried is 1.5 μs.

The table of FIG. 4 identifies states of components of host repeater 106 in each of multiple time periods of operation. In an initial time period, which may be just prior to receiving a micro frame, and in the case of second and subsequent micro frames may include the time period of the turn-on delay of the previous micro frame, transmitter 122 and LOS 134 of eUSB2 port 108 are in a low power state, e.g., a standby state. In the initial time period, receiver 124 and squelch detector 130 of eUSB2 port 108 are active, e.g., in an ON state. In USB 2.0 port 112, receiver 128, squelch detector 132 and DSC 136 are in a low power or standby state, while transmitter 126 is active or ON during the initial time period. This state configuration of components of host repeater 106 during the initial time period may be considered state 1.

Transmitter 122, LOS 134, receiver 128, squelch detector 132 and DSC 136 may then be controlled to be active or ON during a time period that may correspond to μSOF 302, which is less than 0.2% of micro frame 300 in host mode. Receiver 124, transmitter 126 and host-side squelch detector 130 remain ON in this μSOF time period. Thus, in an example, all high-speed components of host repeater 106 may be ON or active during the μSOF time period. Host repeater 106 then reverts to state 1, and host repeater 106 remains in state 1 during a turn-off delay period, which may correspond to turn-off delay segment 304 of micro frame 300. Thus, host-side squelch detector 130 is active or ON, as are receiver 124 and transmitter 126 in host-to-peripheral data path 140 during the turn-off delay period. Turn-off delay segment 304 is approximately 3-25% of micro frame 300 in host mode.

If no data packet is detected in the current micro frame, e.g., micro frame 300, by host-side squelch detector 130 for a threshold time period, which may start at or in μSOF or at or in the turn-off delay time period and may extend to the end of the turn-off delay time period, transmitters 122 and 126, receivers 124 and 128, peripheral-side squelch detector 132, LOS 134 and DSC 136 are transitioned to OFF or inactive, and such components remain OFF for an idle time period, which may correspond to empty frame segment 306 of micro frame 300. Host-side squelch detector 130 remains ON during the idle time period. Thus, host repeater 106 is in a significantly reduced power state (state 3) during the idle time period, which is approximately 68-90% of an empty micro frame.

Receiver 124 and transmitter 126 in host-to-peripheral data path 140 are then turned back ON and remain ON during a turn-on delay time period, which may correspond to turn-on delay segment 308 of micro frame 300. Receiver 128 and transmitter 122 in peripheral-to-host data path 138 transition to standby where they remain for the turn-on delay time period. Squelch detector 132, LOS 134 and DSC 136 also transition to standby and remain in that state during the turn-on delay time period. The turn-on delay time period may include the initial time period just prior to receiving the next micro frame.

Thus, by disabling, e.g., turning OFF, all high-speed blocks, except host-side squelch detector 130, in host repeater 106 for approximately two-thirds or more of each empty micro frame 300, host repeater 106 reduces overall power consumption by 65-90% without sacrificing performance.

The table of FIG. 5 identifies states of components of peripheral repeater 206 in each of multiple time periods of operation. In peripheral mode, components of peripheral repeater 206 transition between two states: state 1 and very low power state 3.

In an initial time period, which may be just prior to receiving a micro frame, and in the case of second and subsequent micro frames may include the time period of the turn-on delay of the previous micro frame, transmitter 226 and DSC 236 of USB 2.0 port 212 are in a low power state, e.g., a standby state, whereas receiver 228 and host-side squelch detector 232 are active, e.g., in an ON state. In eUSB2 port 208, receiver 224, squelch detector 230 and LOS 234 are in a low power or standby state, while transmitter 222 is active or ON during the initial time period. Thus, components of peripheral repeater 206 are in state 1 during the initial time period. These components may remain in these respective states during the μSOF period and turn-off delay period, which may respectively correspond to μSOF 302 and turn-off delay segment 304 of micro frame 300.

If no data packet is detected in the current micro frame, e.g., micro frame 300, by host-side squelch detector 232 for a threshold time period, which may start at or in μSOF or at or in the turn-off delay time period and may extend to the end of the turn-off delay time period, all high-speed components, except host-side squelch detector 232, are powered down from either the standby state or ON state to the OFF state. Thus, transmitters 226 and 222, receivers 228 and 224, peripheral-side squelch detector 230, DSC 236 and LOS 234 are in the OFF state during an idle period, which may correspond to empty frame segment 306 of micro frame 300. Host-side squelch detector 232 remains ON during the idle time period. Thus, peripheral repeater 206 is in a significantly reduced power state (state 3) during the idle time period, which is approximately 68-90% of an empty micro frame.

During a turn-on delay period after the idle period, components of peripheral repeater 206 assume state 1 configuration. That is, transmitter 226, DSC 236, receiver 224, peripheral-side squelch detector 230 and LOS 234 are controlled to be in the standby state during the turn-on delay period, while receiver 228 and transmitter 222 of the host-to-peripheral data path 240 are controlled to be ON during the turn-on delay period. Host-side squelch detector 232 remains ON.

FIG. 6 is a flow diagram of an example method 600 of operating an example high-speed data communication device, e.g., host repeater 106 and/or peripheral repeater 206, that interfaces between a host and a peripheral device. During a first time period, the repeater, e.g., host-side squelch detector 130 (of host repeater 106 operating in host mode) or host-side squelch detector 232 (of peripheral repeater 206 operating in peripheral mode), detects μSOF of a current micro frame, e.g., micro frame 300 (602). The first time period may correspond to the duration of μSOF of the current micro frame, e.g., μSOF 302 of micro frame 300. In a second time period after the first time period, host-side squelch detector 130 or 232 determines whether at least one data packet is contained in the current micro frame (604). The second time period may correspond to the turn-off delay period of the current micro frame, e.g., turn-off delay segment 304 of micro frame 300.

When it is determined during the second time period that no data packet is contained in the current micro frame, all presently active high-speed components of the repeater, e.g., host repeater 106 or peripheral repeater 206, except a squelch detector, e.g., host-side squelch detector 130 or 232, are controlled to be inactive during a third time period after the second time period (606). In an example host mode operation, squelch detector 130 remains active during the third time period, and in an example peripheral mode operation, squelch detector 232 remains active during the third time period. The third time period may correspond to the empty frame or idle segment of the current micro frame, e.g., empty frame or idle segment 306 of micro frame 300.

After the third time period, a receiver transmitter pair in the host-to-peripheral data path (e.g., receiver 124 and transmitter 126 in host mode or receiver 228 and transmitter 22 in peripheral mode) are activated such that such receiver transmitter pair is active in a fourth time period (608). The fourth time period may correspond to turn-on delay segment 308 of micro frame 300.

In an example, active components may include components that are on and in standby, and controlling each such component to be inactive may mean transitioning that component to the OFF state. In an example, host-side squelch detector 130 or 232 is in the ON state during all time periods.

In an example, a receiver and a transmitter in the host-to-peripheral data path are in an ON state during the first time period and during the fourth time period after the third time period.

FIG. 6 depicts one possible order of operation in terms of time periods, states and transitions. Alternative and/or additional time periods, states and/or transitions may be employed.

Various examples of low-power repeaters and methods of operating the same are provided. Such repeaters employ protocol-aware architecture that exploits the USB micro frame and packet structure and the recognition that many micro frames contain no data packets. The specific configurations of repeater components may vary depending on application and design constraints. Different states than those described herein may be used. For example, depending on power constraints, OFF components in a particular state may be in a standby or other low power state between ON and OFF. Also, the teachings herein may be applied to other interfaces including redrivers, which may be used to extend link distances and boost signal quality on a USB bus.

The term "coupled" is used throughout the specification. The term and derivatives thereof may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements may instead include only the semiconductor elements within a single physical device (e.g., a semiconductor die and/or integrated circuit (IC) package) and may be adapted to be coupled to other elements and/or voltage or current sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. A component, unless otherwise stated, may be representative of multiple instances of components configured to perform the stated functionality.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value.

Modifications of the described examples are possible, as are other examples, within the scope of the claims. Moreover, features described herein may be applied in other environments and applications consist with the teachings provided.

What is claimed is:

1. A repeater comprising:
a host-side squelch detector; and
a host-side receiver and a host-side transmitter, each coupled to the host-side squelch detector, and the host-side receiver and the host-side transmitter are configured to be in an inactive state for a second time period responsive to the host-side squelch detector determining that a micro frame discludes a data packet during a first time period.

2. The repeater of claim 1 further comprising:
a peripheral-side squelch detector; and
a peripheral-side receiver and a peripheral-side transmitter, each coupled to the peripheral-side squelch detector, and the peripheral-side receiver, the peripheral-side transmitter and the peripheral-side squelch detector are configured to be in the inactive state for the second time period responsive to the host-side squelch detector determining that the micro frame discludes the data packet during the first time period.

3. The repeater of claim 2, wherein the host-side squelch detector is configured to be in an active state after the second time period and before a next micro frame is received.

4. The repeater of claim 3, wherein the host-side receiver and the peripheral-side transmitter are configured to be in the active state after the second time period and before the next micro frame is received.

5. The repeater of claim 4, wherein the host-side transmitter, the peripheral-side receiver, and the peripheral-side squelch detector are configured to be in a standby state during the first time period.

6. The repeater of claim 5, wherein the host-side transmitter, the peripheral-side receiver, and the peripheral-side squelch detector are configured to be in the standby state after the second time period and before the next micro frame is received.

7. The repeater of claim 5, wherein the host-side squelch detector, the host-side receiver and the peripheral-side transmitter are configured to be in the active state during an initial time period before the first time period.

8. The repeater of claim 7, wherein the host-side transmitter, the peripheral-side receiver, and the peripheral-side squelch detector are configured to be in the standby state during the initial time period before the first time period.

9. The repeater of claim 8 further comprising:
a loss of signal detector (LOS) coupled to the host-side squelch detector, and configured to be in the inactive state during the second time period; and
a disconnect detector coupled to the peripheral-side squelch detector, and configured to be in the inactive state during the second time period.

10. A circuit comprising:
a first receiver and a first transmitter;
a second transmitter coupled to the first receiver;
a second receiver coupled to the first transmitter and the second transmitter;
a first detector coupled to the first receiver and the first transmitter; and
a second detector coupled to the second receiver and the second transmitter;
wherein the first receiver, the first transmitter and the second detector are configured to be in an inactive state for a second time period responsive to the first detector determining that a micro frame discludes a data packet during a first time period.

11. The circuit of claim 10, wherein the first receiver and the first transmitter are coupled to a USB 2.0 port, and the second receiver and the second transmitter are coupled to an eUSB2 port.

12. The circuit of claim 10, wherein the first receiver and the first transmitter are coupled to an eUSB2 port, and the second receiver and the second transmitter are coupled to a USB 2.0 port.

13. The circuit of claim 12, wherein the second receiver and the second transmitter are configured to be in the inactive state for the second time period responsive to the first detector determining that the micro frame discludes the data packet during the first time period.

14. The circuit of claim 13, wherein the first detector is configured to be in an active state after the second time period and before a next micro frame is received.

15. The circuit of claim 14, wherein the first receiver and the second transmitter are configured to be in the active state after the second time period and before the next micro frame is received.

16. The circuit of claim 15, wherein the first transmitter, the second receiver, and the second detector are configured to be in a standby state during the first time period.

17. The circuit of claim 16, wherein the first transmitter, the second receiver, and the second detector are configured to be in the standby state after the second time period and before the next micro frame is received.

18. A method comprising:
detecting by a first detector, during a first time period, a start of a micro frame;
determining, during a second time period after the first time period, whether at least one data packet is contained in the micro frame; and
inactivating, in response to determining that the micro frame discludes a data packet during the second time period, a first receiver, a first transmitter, a second receiver, a second transmitter and a second detector during a third time period after the second time period, the first receiver and the first transmitter are coupled to the first detector, and the second transmitter is coupled to the first receiver and the second detector, and the second receiver is coupled to the second transmitter and the second detector.

19. The method of claim 18 further comprising keeping the first detector active during the third time period.

20. The method of claim 18 further comprising activating the first receiver and the second transmitter after the third time period and before the next micro frame is received, wherein the first transmitter, the second receiver and the second detector are configured to be in a standby state after the third time period and before the next micro frame is received.

* * * * *